United States Patent [19]

Munson et al.

[11] Patent Number: 5,914,157

[45] Date of Patent: *Jun. 22, 1999

[54] SOLVENTLESS HOT MELT PROCESS FOR THE PREPARATION OF PRESSURE SENSITIVE ADHESIVES

[75] Inventors: Daniel C. Munson; Andrew C. Lottes, both of St. Paul, Minn.; Angelo Psellas; Denis A. Brisson, both of Brockville, Canada

[73] Assignee: Minnesota Mining and Manufacturing Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/521,921

[22] Filed: Aug. 31, 1995

[51] Int. Cl.⁶ ........................................................ C08J 7/04
[52] U.S. Cl. ..................... 427/516; 222/152; 222/226; 427/208.4; 427/385.5; 427/496; 427/551; 427/558; 427/559; 427/595
[58] Field of Search ...................................... 427/496, 516, 427/551, 558, 559, 595, 208.4, 385.5; 222/152, 226

[56] References Cited

U.S. PATENT DOCUMENTS 4,588,637  5/1986  Chiu ......................................... 428/355
4,678,794  7/1987  Huddleston et al. .................... 523/351
5,242,727  9/1993  Briddell et al. ............................ 428/42

FOREIGN PATENT DOCUMENTS 6128542   5/1994  Japan .
7126590   5/1995  Japan .
WO 94/11175  5/1994  WIPO .

OTHER PUBLICATIONS

Rubbercon '77, "Delayed Action Peroxide Vulcanization Systems", Y.W. Chow and G.T. Knight, pp. 24.1–24.12. (No date avail.).
Rubbercon '77, "New Developments in Rubber–Bound Antioxidants", Gerald Scott, pp. 19/1–19/18. (No date avail.).
Rubber World, "Crosslinking plasticizers for injection molding", J. Edgar Lohr, Jr., et al., pp. 47–51, Oct. 1971.
Schenectady Chemicals Inc., Material Data Sheets for SP–1068, SP–1077, SP–553, SP–560, SP–6701, and CRJ–418 Resins. (No data avail.).

*Primary Examiner*—Bernard Pianalto
*Attorney, Agent, or Firm*—Doreen S. L. Gwin

[57] ABSTRACT

The incorporation of a non-thermosettable phenolic tackifying resin surprisingly provides improved solvent free, hot melt processing of hydrocarbon elastomers with crosslinking promoters to form pressure sensitive adhesive tapes. The tapes advantageously have a desirable balance of the properties of resistance to slow rate peel and fast rate peel adhesion.

15 Claims, 1 Drawing Sheet

SOLVENTLESS HOT MELT PROCESS FOR THE PREPARATION OF PRESSURE SENSITIVE ADHESIVES

FIELD OF THE INVENTION

In one aspect, the invention relates to a solvent free, hot melt process for the manufacture of pressure sensitive adhesive (PSA) tape based on tackified hydrocarbon elastomer formulated with crosslinking promoters. More specifically, the process includes the incorporation of non-thermosettable phenolic tackifying resin into the PSA formulation to surprisingly lower processing viscosities and improve the resistance to low stress peel of the ultimate PSA tape without dramatically increasing the fast rate peel adhesion. In another aspect, this invention relates to a pressure sensitive adhesive (PSA) composition comprising a hydrocarbon elastomer and a non-thermosettable phenolic tackifying resin, and a tape comprising the PSA composition.

BACKGROUND OF THE INVENTION

PSAs based on non-thermoplastic hydrocarbon elastomers such as natural rubber, butyl rubber, synthetic polyisoprene, ethylene-propylene, polybutadiene, polyisobutylene, or random styrene-butadiene random copolymer rubber are well known in the art. The dominant means of processing such adhesives comprises masticating the elastomer on a two roll mill or in a Banbury type internal mixer, dissolving the elastomer and other adhesive components in a hydrocarbon solvent, coating the solution onto a backing, and drying the coated product to remove the solvent. This technology is discussed in *Handbook of Pressure Sensitive Adhesive Technology*, D. Satas (ed.), p. 268. Van Nostrand, N.Y., (1989). The solvent process has the disadvantages of being labor intensive, having low production rates, and emitting large amounts of potentially hazardous solvents to the atmosphere thereby requiring expensive equipment for solvent recovery and/or incineration. Moreover, such solvent based processes have become increasingly undesirable for use in making adhesive tapes because of increasing environmental and safety regulations throughout the world.

Hot melt extrusion of pressure sensitive adhesives employing non-thermoplastic hydrocarbon elastomers such as natural rubber has been shown. However, low molecular weight plasticizing aids such as processing oils, elastomer oligomers, waxes, or other materials defined and described as plasticizers in *Dictionary of Rubber*, K. F. Heinisch, pp. 359–361, John Wiley & Sons, New York, (1974), are used as major components in the adhesive formulations. These plasticizing aids ease processing but detract from the ability of the finished adhesive to sustain a load and are generally known in the art to degrade adhesive performance.

WO 94/11175 describes a solvent free, hot melt process for non-thermoplastic hydrocarbon elastomers that obviates the need to use plasticizers as major components of the adhesive formulation. The process employs a continuous compounding device and hot melt processing techniques. The continuous compounding device has a sequence of alternating conveying and processing zones. The elastomer is continuously conveyed from one zone to another by the device. The processing zones are capable of masticating the elastomer. They are also capable of mixing additives into the elastomer. The adhesive composition can be applied to a moving web directly from the compounding device so as to provide a continuous method for the manufacture of PSA tape.

Oftentimes it is desirable to crosslink the coated PSA by exposure to ionizing radiation, such as electron beam or ultraviolet radiation, to enhance the cohesive strength (i.e., shear strength) of the material. To this end, crosslinking promoters are added to the elastomer to achieve higher crosslinking densities at lower radiation dosages. It has been found, however, that these crosslinking promoters (typically of the maleimide type) react with freshly scissioned elastomer, causing the viscosity to escalate. This, in turn, makes continuous processing using the techniques of WO 94/11175 very difficult.

In addition to these processing difficulties, it has also been found that adhesive tapes prepared by these techniques lack sufficient resistance to low stress peel for some applications. Such tapes are not able to effectively dissipate stresses such as, for example, those caused by temperature fluctuations, dimensional changes in the backing, and the recovery forces of a backing applied under tension. As a result, they may lift from a substrate to which they are applied.

Several attempts have been made to remedy the viscosity escalation and adhesive performance problems described above using techniques known in the art. For example, free radical neutralizing amines and hindered-phenol compounds have been added to adhesive formulations. It has been found, however, that the addition of these free radical neutralizing amines or hindered-phenol compounds to the process described above fails to overcome the viscosity escalation problem, and the tape properties (especially resistance to low stress peel) are not improved.

Thermosettable phenolic resins have also been added to adhesive formulations. However, in the solventless process described above, thermosettable phenolic resins begin to cure and crosslink in the compounder at the temperatures necessary to process the mix, causing small, tightly gelled impurities to form in the melt, resulting in processing and coating problems and product defects.

Tackifying resins can also be added in large quantities to improve resistance to low stress peel. The addition of tackifying resins, however, also typically increases the fast rate peel adhesion beyond acceptable levels with corresponding adhesive transfer problems and does not overcome the viscosity escalation problem.

SUMMARY OF THE INVENTION

A process has now been discovered which overcomes the viscosity escalation problem associated with the use of crosslinking promoters to improve shear strength as described above and provides a PSA tape having good resistance to low stress peel while maintaining moderate fast rate peel adhesion. Surprisingly, both of these are accomplished by the addition of non-thermosettable phenolic tackifying resin to the adhesive formulation.

Accordingly, in one aspect the present invention provides a process for the solvent free compounding of PSAs based upon tackified hydrocarbon elastomer formulated with crosslinking promoter and a non-thermosettable phenolic tackifying resin. The term "non-thermosettable" with respect to the phenolic resin means that the resin does not react with the hydrocarbon elastomer to form crosslinks. The term "crosslinking promoters" refers to compounds which react with free radicals to ultimately produce crosslinks in the PSA composition.

The process employs a continuous compounding device and hot melt processing techniques such as those described in WO 94/11175. The process employs a continuous compounding device that has a sequence of alternating conveying and processing zones. The elastomer is continuously conveyed from one zone to another by the device. The processing zones are capable of masticating the elastomer. They are also capable of mixing additives into the adhesive.

In the process of the invention, a hydrocarbon elastomer is fed to a first conveying zone of the compounding device. This first zone transports the elastomer to a first processing zone where the elastomer is masticated. The masticated elastomer is then transported to other zones in the process where a non-thermosettable phenolic tackifying resin, crosslinking promoter, and optionally other adjuvants are added and mixed with the masticated hydrocarbon elastomer to form a blend. The tackifying resin, crosslinking promoter and optional adjuvants may be added in any order to the masticated elastomer. The blend can then be discharged from the compounding device and stored for later use. Alternatively, the blend can be applied to a web, preferably a moving web, in the form of a thin film.

In a preferred embodiment, the crosslinking promoter and non-thermosettable phenolic tackifying resin are added together in one step as a blend, optionally with other additives such as other tackifying resin(s). In an even more preferred embodiment, the masticated elastomer is first blended with a non-phenolic tackifying resin, followed by addition of a blend of the crosslinking promoter and non-thermosettable phenolic tackifying resin.

The non-thermosettable phenolic tackifying resin surprisingly prevents the escalation of viscosity that is typically seen when crosslinking promoters are added to freshly scissioned elastomer. In addition, the non-thermosettable phenolic tackifying resin improves the resistance to low stress peel of the ultimate PSA tape without dramatically increasing the fast rate peel adhesion.

Suitable non-thermosettable phenolic tackifying resins for use in this invention include phenol-aldehyde condensates, terpene-phenol reaction products, and phenolic reaction products.

A wide variety of hycrocarbon elastomers can be employed in the present invention. Preferred hydrocarbon elastomers include non-thermoplastic hydrocarbon elastomers such as natural rubber and blends thereof.

Suitable crosslinking promoters (also known as synergists, pro-rads, or coupling agents) for use in the present invention include reactive aromatic, aliphatic or heteroatomic monomers or oligomers that contain at least two carbon—carbon double bonds usually in the form of acrylate, allylic or maleimide moieties. These compounds, which are well known in the art, react with radicals to ultimately produce crosslinks. These radicals are often produced by exposure of the elastomer to radiation such as electron beam or ultra-violet radiation.

In another embodiment, the invention provides a PSA tape prepared using the process described above. In still another embodiment, the invention provides a PSA composition comprising:

(a) 100 parts by weight of a hydrocarbon elastomer, and
(b) 0.1 to 400 parts by weight of a non-thermosettable phenolic tackifying resin.

The PSA composition provides a tape having a fast rate peel adhesion of less than 75 ounces/inch (838 gm/cm) and a low stress peel value of at least 5 minutes. Preferably, the non-thermosettable phenolic tackifying resin comprises a non-terpene containing compound.

Preferably, the PSA composition comprises 0.10 to 10 parts by weight crosslinking promoter; 1 to 400 parts by weight non-phenolic tackifying resin; and 0.10 to 15 parts by weight non-thermosettable phenolic tackifying resin, each per 100 parts by weight elastomer. More preferably, the PSA composition comprises 0.25 to 3 parts by weight crosslinking promoter; 10 to 200 parts by weight non-phenolic tackifying resin; and 0.25 to 5 parts by weight non-thermosettable phenolic tackifying resin, each per 100 parts by weight elastomer. Most preferably, the PSA composition comprises 0.5 to 2 parts by weight crosslinking promoter; 50 to 100 parts by weight non-phenolic tackifying resin; and 0.5 to 3 parts by weight non-thermosettable phenolic tackifying resin, each per 100 parts by weight elastomer.

The invention further provides a PSA tape comprising the PSA composition coated onto a backing. The PSA tape exhibits a desirable balance of the properties of resistance to low stress peel with moderate fast peel rate adhesion. PSA tapes of the invention may be used in a variety of applications, but are especially useful as masking tapes.

DETAILED DESCRIPTION OF THE INVENTION

The process of the invention employs a continuous compounding device. A number of such devices are known. They may comprise a single unit or a series of units interconnected so as to continuously process the elastomer. The device has a sequence of alternating conveying and processing sections which are interconnected. An example of a continuous compounding device useful in the present invention is a twin screw extruder having a sequential series of conveying and processing zones. A plurality of input openings are provided along the length of the extruder to facilitate the addition of materials. Additions of material, whether elastomer, tackifying resin, crosslinking promoters, non-thermosettable phenolic tackifying resin, or other adjuvants, are made through input ports to a partially full conveying zone or zones. A melt pump and filter may be present either as an integral part of the extruder, or as a separate unit to facilitate both the removal of the adhesive from the compounding device and the removal of unwanted contaminants from the adhesive stream.

In the practice of the process, the elastomer is added to a first conveying zone of the compounding device at a controlled rate so that the elastomer does not completely fill the zone. The elastomer may be pelletized by grinding or extrusion pelletization prior to being fed to the compounding device. Alternately, it may be fed directly into the compounding device without grinding or pelletization using a device such as a Moriyama extruder. If the elastomer has been pelletized, it is preferably treated with a material such as talc to prevent agglomeration of the pellets.

The elastomer is then transported by the first conveying zone to a first processing zone where it is masticated. The first processing zone typically is designed to be essentially completely full and to masticate the elastomer. Additionally, the processing zone conveys the elastomer to the next zone. It may be desirable to provide the first processing zone as at least two discrete processing sections separated from each other by a transporting section. This permits the elastomer to be masticated in steps, with cooling of the masticated elastomer between each step.

If two or more elastomers are to be processed in the invention, they may both be added to the first conveying zone and masticated in the first processing zone. Alternatively, the elastomers may be added sequentially to different conveying zones with sequential mastication after each elastomer addition. Sequential elastomer addition to different conveying zones may also be employed when a single elastomer is used.

Mastication is preferably carried out in the absence of materials which will lubricate the elastomer and prevent reduction of its molecular weight. This does not however, preclude the presence of small amounts of such materials, provided that the amount present does not effectively reduce the rate of mastication. Certain other solid adjuvants, such as talc, inorganic fillers, antioxidants, and the like, may be fed to the compounding device such that they are present during mastication.

The masticated elastomer then passes from the first processing zone to subsequent conveying and processing zones where non-thermosettable phenolic tackifying resin, crosslinking promoter and optionally other additives, are added and blended therein. In a preferred embodiment, the crosslinking promoter and non-thermosettable phenolic tackifying resin are added together in one step as a blend, optionally with other additives such as other tackifying resin(s). In a more preferred embodiment, the masticated elastomer is first blended with a non-phenolic tackifying resin, followed by addition of a blend of the crosslinking promoter and non-thermosettable phenolic tackifying resin.

A number of techniques may be used to feed these materials to the compounding device. For example, a constant rate feeder such as a K-Tron loss-in-weight feeder may be used to add solid materials. Heated pail unloaders, gear pumps, and other appropriate equipment for feeding liquids at a controlled rate may be used to feed the liquids to the compounding device. Additives present at low concentration may be pre-blended with one or more of the other components for more accurate addition.

Although substantially all mastication occurs in the first processing zone, there may be some mastication which occurs in subsequent processing of the elastomer through the compounding device. This additional mastication may occur in subsequent conveying or processing zones. In any event, the degree to which the elastomer must be masticated in the practice of the invention varies with each elastomer employed and the finished product desired. Generally, the elastomer must be sufficiently masticated to (i) permit subsequently added tackifying resins and any other adjuvants to be satisfactorily mixed into the elastomer to form a blend and (ii) to permit the blend to be extruded as a stream that is essentially free from both rubber particles and from visually identifiable regions of unmixed tackifying resin and any other adjuvants.

Once the masticated elastomer, tackifying resin, crosslinking promoter, and any other adjuvants have been formed into the blend, the composition may now be referred to as an adhesive. This adhesive typically has a viscosity at the processing temperature in the range from 500 Poise to 5000 Poise (measured at a shear rate of 1000 $sec^{-1}$). Higher viscosity adhesives may also be processed in the process of the invention provided the practical limitations of the process are not exceeded. For example, viscosity limits may have to be imposed to protect equipment such as pumps, filters, hoses, etc. The processing temperature of the adhesive is typically in the range of 100–200° C.

The adhesive may be discharged from the compounding device into a storage container for later additional processing or use. Alternatively, it may be discharged directly onto a support in the form of a thin film. Preferably, the support comprises a moving web. The thin adhesive film may be formed by pumping the adhesive through a coating die, optionally with the aid of a gear pump or other suitable device to develop sufficient pressure. The die is preferably of the contacting variety (i.e. not a drop die) which smears the adhesive onto a moving web supported on a backup roll. The die may have a flexible blade, a cylindrical rubber wipe, or a rotating cylindrical metal rod on the downstream side of the die opening to spread the adhesive. The die may be located at the output of the compounding device to allow coating in-line with the compounding and extruding operations. Alternatively, the adhesive may be discharged from the compounding device and fed to the coating die using a separate extruder, melt pump, or combination of extruder and melt pump with sufficient pressure to force the adhesive mixture through the die. The adhesive may optionally be filtered prior to feeding to the coating die.

The coated adhesive is preferably crosslinked by exposure to radiation, such as electron beam or ultraviolet radiation, to enhance the cohesive strength of the material. Crosslinking may be carried out in-line with the coating operation or may occur as a separate process. The degree of crosslinking achieved is a matter of choice and is dependent upon a number of factors such as the end product desired, the elastomer used, the thickness of the adhesive layer, etc. Techniques for achieving crosslinking via exposure to radiation are known to those of skill in the art.

A release coating may also be optionally applied to the web, either before or after application of the adhesive. The release coating may be continuous or discontinuous on the web and is normally on the surface of the web opposite that which ultimately bears the adhesive. The release coating may be applied either in-line with the coating or crosslinking operations, or as a separate process.

A twin screw extruder is preferably used as the compounding device in the invention. The extruder screw should be configured to masticate the elastomer in the first processing zone prior to addition of the tackifying resin. Additionally, if a blend of elastomers is used in the adhesive, the first processing zone preferably allows mastication and blending of the elastomer components. The portion of the extruder and screw following the first processing zone must be designed to permit the addition of the tackifying resin and other additives to the elastomer and good mixing of the elastomer with these materials. Preferably, the screw is designed so that a homogeneous adhesive composition results.

The design of the screw to achieve mastication, conveying and blending follows normal practices known in the art. Namely, the screw has a sequence of conveying and processing zones. Flow restriction and mixing elements are provided so as to achieve appropriate flow along the screw and obtain appropriate mastication and mixing. The conveying zones may contain ordinary Archimedes screw elements. The processing zones may contain kneading blocks, pin mixers, or other elements designed for mastication, compounding and mixing. Flow restriction elements, such as kneading blocks arranged with a reverse pitch, reverse pitched conveying screws, a disk element or other device designed to restrict the flow of material, may also be present in the processing zone to ensure that the portion of the processing zone preceding these elements tends to run full of material while the conveying zone following them tends to run only partially full.

The process can employ either aerobic or anaerobic processing. For purposes of this invention, aerobic processing means that gas which contains available oxygen (such as compressed air) is intentionally injected into the compounding device so as to promote oxidative breakdown of the hydrocarbon elastomer. Anaerobic processing means that no oxygen-available gas is intentionally injected into the compounding device. However, minor amounts of air may be present in anaerobic processing in the practice of the invention.

Aerobic processing may be advantageously utilized when the hydrocarbon elastomer will preferentially undergo chain scission rather than crosslinking and/or chain extension. Aerobic processing allows a greater reduction in the molecular weight of the elastomer in a relatively short period of time.

Anaerobic processing may be advantageously utilized when elastomers which crosslink under oxidative conditions are used. This mitigates the problem of these elastomers crosslinking during processing. Anaerobic processing may also be used with elastomers that undergo breakdown under oxidative conditions so as to achieve a higher molecular weight than would be achieved under aerobic conditions. This increases the cohesive strength of the adhesive and minimizes the degree of later crosslinking needed to provide enhanced cohesive strength. Anaerobic processing of either type of elastomer also results in adhesives having lower odor and lighter color.

Tackifiers or tackifying resins generally refer to materials which are miscible with the elastomer, have a number average molecular weight (Mn) of 10,000 grams per mol (g/mol) or less, a softening point above 70° C. as determined using a ring and ball apparatus, and a Tg of −30° C. or more as measured by differential scanning calorimetry (DSC).

Suitable non-thermosettable phenolic tackifying resins for use in this invention include phenol-aldehyde condensates, terpene-phenol reaction products, and phenolic reaction products obtained from further condensing a formed resole resin with additional phenolic compound. A variety of phenolic compounds can be used to prepare these resins, for example, monohydroxy and polyhydroxy phenols and substituted derivatives thereof, as well as mixtures of such compounds. The phenolic compound can be substituted with a variety of groups such as alkyl, alkoxy, amino, halogen and aryl groups. Representative phenolic compounds include, but are not limited to, the following: phenol, p-t-butylphenol, p-phenylphenol, p-chlorophenol, p-alkoxyphenol, o-cresol, m-cresol, p-cresol, o-chlorophenol, m-bromophenol, ethylphenol, amylphenol, nonylphenol, resorcinol, pyrocatechol, pyrogallol, bisphenol-A and the like.

Aldehydes that can be condensed with phenolic compounds to form phenol-aldehyde resins include, but are not limited to, formaldehyde acetaldehyde, propionaldehyde, isobutyraldehyde, 2-ethylbutyraldehyde, glyceraldehyde, as well as compounds that decompose to formaldehyde, such as paraformaldehyde, trioxane, and hexamethylenetetramine. The phenol-aldehyde resins may be prepared using well-established methods by condensing phenolic compounds with aldehydes, usually under acidic or neutral conditions. Examples of commercially available phenol-aldehyde condensates are SP-1068™ resin (a pure phenolic thermoplastic material) and SP-1077™ resin (an alkylphenol thermoplastic material) both from Schenectady Chemicals, Inc.

The terpene-phenol resins are usually produced from the acid-catalyzed reaction between terpenes [i.e., oligomers of isoprene having the general formula of $(C_5H_8)_n$.], sesquiterpenes and/or triterpenes and various phenols. Examples of commercially available thermoplastic terpene-phenol resins include SP-553™ and SP-560™ both from Schenectady Chemicals, Inc.

Useful phenolic resins also include the reaction products arising from the acid-catalyzed reaction of phenols with at least one terpene, sesquiterpene or triterpene followed by further reaction with a cyclic polyolefin; for example, wood rosin.

Suitable non-phenolic tackifying resins include rosin and rosin derivatives, polyterpenes, coumarone indenes, hydrogenated resins and hydrocarbon resins, for example: alpha pinene-based resins, beta pinene-based resins, limonene-based resins, piperylene-based hydrocarbon resins, esters of rosins, and polyterpene.

Suitable crosslinking promoters (also known as synergists, pro-rads, or coupling agents) for use in the present invention include reactive aromatic, aliphatic or heteroatomic monomers or oligomers that contain at least two carbon—carbon double bonds usually in the form of acrylate, allylic or maleimide moieties. These compounds, which are well known in the art, react with radicals to ultimately produce crosslinks.

The acrylate crosslinking promoters are multifunctional acrylates and methacrylates selected from the group that consists of acrylic and methacrylic acid esters of alcohols, usually polyols. Examples of these systems include 1,6-hexanediol dimethacrylate, 1,6-hexanediol diacrylate, trimethylolpropane triacrylate, trimethylolpropane trimethacrylate, pentaerythritol tetracrylate and pentaerythritol tetramethacrylate. For further discussion of acrylate crosslinking promoters, see "Crosslinking Plasticizers for Injection Molding", Lohr, J. E. and Samples, R.; Rubber World 1971, 165, 47.

The allylic crosslinking promoters are multifunctional alkenes that are usually prepared from the reaction of allylic halides with various nucleophiles to produce allylic ethers, esters, amines and the like. Examples of these systems include triallyl cyanurate, triallyl isocyanurate and allyl methacrylate.

The maleimide crosslinking promoters are produced from the reaction of maleic acid anhydride and multifunctional amines; for example, 1,6-diaminoahexane, bis(4-aminophenyl)methane, tris(2-aminoethyl)amine and 1,3-phenylenediamine. For further discussion of the preparation and use of maleimides as crosslinking agents, see: "Crosslinking of Polymers with Dimaleimides", Kovacic, P. and Hein, R. W.; J; Am. Chem. Soc. 1959, 81, 1187; "Crosslinking of Unsaturated Polymers with Dimaleimides", Kovacic, P. and Hein, R. W.; J. Am. Chem. Soc. 1959, 81, 1190; and "Vulcanization with Maleimides", Tawney, P. O., Weisch, W. J., Van der Berg, S, and Relyea, D. I.; J. Appl. Polym. Sci. 1964, 8, 2281.

A wide variety of hydrocarbon elastomers can be employed in the present invention. These materials may be used singly or blended together in the practice of the invention. Examples of these elastomers include natural rubber, butyl rubber, synthetic polyisoprene, ethylene-propylene rubber, ethylene-propylene-diene monomer rubber (EPDM), polybutadiene, polyisobutylene, poly(alpha-olefin) and styrene-butadiene random copolymer rubber. Preferred hydrocarbon elastomers include non-thermoplastic materials such as natural rubber and blends of elastomers comprising at least 50 percent by weight natural rubber.

A number of adjuvants may also be used in the adhesive. Examples of such adjuvants include antioxidants, such as hindered phenols, amines, and sulfur and phosphorous hydroperoxide decomposers; inorganic fillers such as talc, zinc oxide, titanium dioxide, aluminum oxide, and silica; plasticizing aids such as those materials described as plasticizers in the *Dictionary of Rubber*, K. F. Heinisch, pp. 359, John Wiley & Sons, New York (1974), oils, elastomer oligomers and waxes; and the like. Typically the antioxidant comprises up to 5 parts by weight per 100 parts by weight elastomer; the inorganic filler comprises up to 50 parts by weight per 100 parts by weight of elastomer; and the plasticizing aids up to 10 percent by weight of the total adhesive. The plasticizing aid may be incorporated prior to, during, or after the mastication of the elastomer. Whenever it is added, it should not prevent effective mastication of the elastomer. Preferably, the use of plasticizing aids is unnecessary.

The adhesive formulation may additionally comprise chemical "blowing" or "foaming" agents that liberate gas upon thermal decomposition and create a cell structure within the adhesive mass. The cell structure in the adhesive changes the adhesive topography, density, compressibility, and conformability to allow tape made with this adhesive to display instant adhesion, or "quick stick", properties superior to those exhibited by the thinner, unfoamed extruded adhesive and comparable to foamed adhesives prepared by solvent evaporation.

When a foamed adhesive is desired, the blowing agent is added to the elastomer at a temperature below that of the decomposition temperature of the blowing agent. It is then mixed at such a temperature to distribute it throughout the elastomer in undecomposed form. Preferably the blowing agent comprises from 0.5 to 5 weight percent of the adhesive layer. However, lesser or greater amounts may be utilized if desired.

Useful blowing agents typically decompose at a temperature of 140° C. or above. Examples of such materials include synthetic azo-, carbonate-, and hydrazide-based molecules. Specific examples of these materials are Celogen TO (4,4' oxybis (benzenesulfonylhydrazide), Hydrocerol BIF or BIH (preparations of carbonate compounds and polycarbonic acids), Celogen AZ (azodicarboxamide) and Celogen RA (p-toluenesulfonyl semicarbazide).

Once dispersed, the blowing agent may be activated after extrusion by, for example, heating the extrudate to a temperature above its decomposition temperature. Decomposition of the blowing agent liberates gas, such as $N_2$, $CO_2$ and/or $H_2O$, and creates cell structure throughout the adhesive mass. Decomposition may be done before or after the adhesive is cured.

A number of organic and inorganic materials may be used as the web in the practice of the present invention. Such materials include polymeric films, metallic foils, paper, ceramic films, and the like. Furthermore, the web may comprise a plurality of fibers in a mat-like construction. The fibers may be combined to form either a woven or a non-woven (i.e., randomly arranged collection of fibers) web.

Virtually any PSA tape can be made by the process of the invention. Examples of such tapes include masking tape, packaging tape (such as box sealing and strapping tapes), decorative tape, protective tape and film, label stock, diaper closure tape, medical tape (such as hospital and athletic tapes), etc. Additionally, the process can be used to make any article having one or more layers of a hydrocarbon elastomer-based PSA on a backing.

This invention is illustrated by the following examples, but the particular materials and amounts thereof recited in these examples, as well as other conditions and details should not be construed to unduly limit this invention.

EXAMPLES

Test Methods

Fast Rate Peel Adhesion

Fast peel rate adhesion was measured according to ASTM D3330 (or PSTC 1) with the exception that a plate-glass substrate was used in place of a stainless steel substrate and the peel rate was 90 inches/min (2.28 m/min). Preferably, the fast rate peel adhesion values are less than 75 ounces/inch (838 gm/cm), more preferably less than 65 ounces/inch (726 gm/cm).

Resistance to Low Stress Peel

Resistance to low stress peel was measured by adhering the adhesive-bearing side of a 0.75 inch (19 mm) wide tape sample to a cleaned stainless steel panel having a length of 4 inches (10 cm). The panel was cleaned with a diacetone alcohol wash and three washes of either heptane or ethanol. The tape was laminated to the stainless steel panel using two passes of a 4.5 pound (2 kg) roller. The testing was done in a constant temperature room at 72° F. (22° C.) and 50% relative humidity. The panel was suspended horizontally, and a 200 gram weight was fastened to one end of the tape sample. The low stress peel value was recorded as the amount of time required for the tape sample to travel 4 inches (10.16 cm). Preferably, the low stress peel values are at least 5 minutes, more preferably at least 20 minutes.

Shear Strength

Shear strength was measured by placing two 0.5 inch (1.3 cm) wide strips of tape face to face so that they overlap each other by 0.5 inch (1.3 cm), resulting in a mutual contact area of 0.5 inch (1.3 cm) by 0.5 inch (1.3 cm). The two strips were pressed together by rolling three times using a 300 gram roller. They were then tensioned by the application of 1000 grams applied between the free ends of the two strips. The time for the face to face bond to fail by sliding apart was denoted as the shear value. Preferably, the shear values are greater than 50 minutes, more preferably greater than 150 minutes.

Equipment Configuration and Extruder

Figure 1:
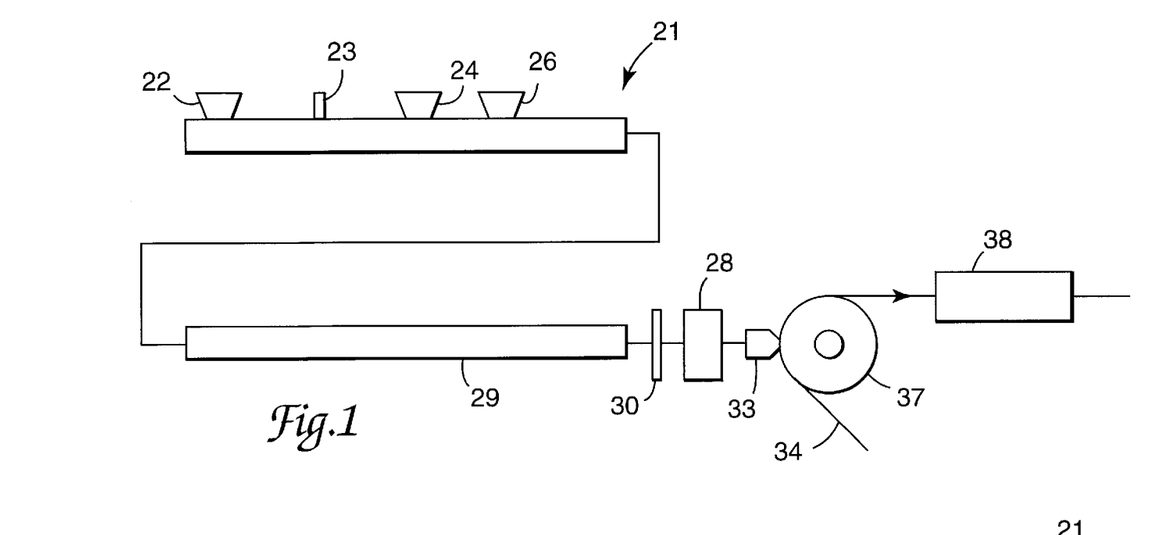
FIG. 1 provides a schematic representation of a continuous compounding, coating and crosslinking equipment configuration used in the examples of the present specification.
Figure 2:
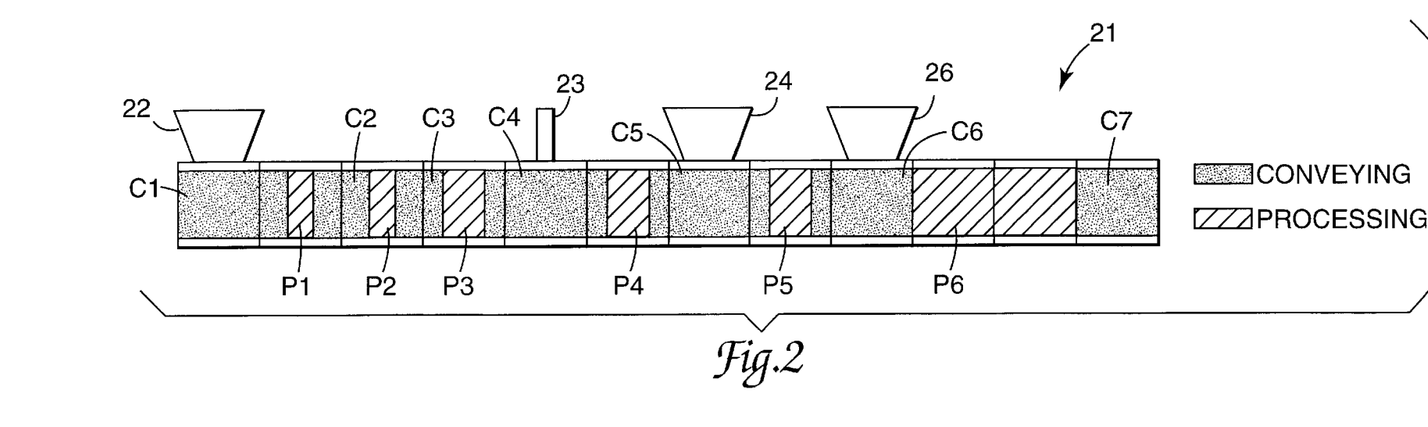
FIG. 2 is a schematic representation of the screw used in the examples of the present specification.

FIG. 1 provides a schematic representation of the continuous compounding, coating and crosslinking equipment configuration used in the following examples. FIG. 2 provides a schematic representation of the screw used in the following examples.

With specific regard to FIG. 1, this diagram shows compounding device 21 equipped with an elastomer feed hopper 22; an injection jet 23 for injecting an oxygen-containing gas into the compounding device for aerobic processing; and solid feed hoppers 24 and 26 near the discharge of the extruder 21. Feed hoppers 22, 24 and 26 controlled the rate of material delivered to compounding device 21 by continuously monitoring the weight of material in the feed hopper. The specific compounding device 21 used in the following examples was a Werner-Pfleiderer co-rotating twin screw extruder.

The extrudate from compounding device 21 was fed to a single screw extruder 29 to generate enough pressure to push the adhesive through filter 30 and die 33. A Zenith gear pump 28 was provided downstream from filter 30 to meter the adhesive melt to die 33. Die 33 was a 60 inch (152 cm) wide contact extrusion die with a rotating steel rod on the downstream side of the die to smear adhesive onto web 34 which passed around a coating roll 37. The coating roll 37 was a steel roll having a rubber coating on it. The line speed of this configuration was automatically adjusted to achieve the desired coating thickness. The coating was crosslinked at electron beam crosslinking station 38.

The screw design employed in the examples is shown schematically in FIG. 2. The screw design comprised conveying zones C1 to C7 and processing zones P1 to P6 as shown in FIG. 2. The non-thermoplastic elastomer was added in conveying zone C1 through hopper 22. Compressed air was injected in conveying zone C4 through injection port 23. Tackifying resin and other adjuvants were added in conveying zones C5 and C6 through hoppers 24 and 26. More specifically, non-phenolic tackifying resin and antioxidant were added in conveying zone C5, and the crosslinking promoter, non-thermosettable phenolic tackifying resin, and any additional non-phenolic tackifying resin and whitener were added in conveying zone C6. It is noted that the additives may be added in any combination and through any feed hopper available.

The length of the first conveying zone C1 comprised 12.8% of the total length of the extruder. The first processing zone P1 comprised 2.0% of the total length of the extruder. The lengths of the remaining processing and conveying zones (corresponding to FIG. 2) comprised the following percentages based on the total length of the extruder:

| | |
|---|---|
| C2 | 5.0% |
| P2 | 4.0% |
| C3 | 4.4% |
| P3 | 4.0% |
| C4 | 12.8% |
| P4 | 2.9% |
| C5 | 12.2% |
| P5 | 4.9% |
| C6 | 11.5% |
| P6 | 14.8% |
| C7 | 8.3% |

COMPARATIVE EXAMPLE 1

PSA Tape Prepared Without Crosslinking Promoter and Without a Phenolic Tackifying Resin A PSA tape was prepared using the following target formulation:
100 parts elastomer,
80 parts non-phenolic tackifying resin,
4 parts whitener, and
1 part antioxidant.

The tape was prepared as follows:

A controlled Mooney viscosity natural rubber SMR CV60 (available from The Ore Chemical Co., Inc.) was granulated with a two-stage Previero grinder and pushed through a ¼" (0.6 cm) mesh filter and dusted wit talc. This material was then fed to conveying zone C1 of the twin screw extruder at a rate of 9 lbs/min (4.1 kg/min) using a loss-in-weight feeder. The elastomer and talc were masticated in processing zone P1. The elastomer and talc were further conveyed and masticated in zones C2, P2, C3 and P3 as shown in FIG. 2 In conveying zone C4, there was a flow of fresh air, whereby additional oxidation was done to prevent the masticated rubber molecules from "re-knitting."

Further mastication occurred in processing zone P4. Piccotac™ B aliphatic non-phenolic tackifying resin (available from Hercules Chemical Co.) was added in conveying zone C5 at a rate of 1.8 lbs./min (820 gm/min) using a loss-in-weight feeder. A hindered phenol antioxidant, Irganox™ 1010 (available from Ciba-Geigy), was also added in conveying zone C5 using a separate loss-in-weight feeder at a rate of 0.09 lbs/min (41 gm/min). The resulting mixture was masticated/blended in processing zone P5. Additional Piccotac™ B (available from Hercules Chemical Co.) was added at a rate of 5.4 lbs/min (2.5 kg/min) using a loss-in-weight feeder at conveying zone C6. A separate loss-in-weight feeder was used to deliver Titanox™ 2020 whitener (from Kronos Chemical Co.) into conveying zone C6 at a rate of 0.36 lbs/min (160 gm/min). The resulting blend was then masticated in processing zone P6. The resulting blend was transported through conveying zone C7 to a single-screw pumping extruder. The extruder forced the blend trough a filter to a metering pump. The pump metered the blend flow rate through reinforced flexible hosing to an extrusion die. The ratio of the metering pump setting to the coating speed was set to result in an adhesive coating thickness of 1.65 mils (41 micrometers). The coating was radiation cured by exposing to electronic curtain treatment which provided a dose at the top of the coating of 4 Mrads.

The melt temperature through the pumping extruder, filter, and hose was maintained at approximately 135–150 C., and at these temperatures the pressure in the reinforced hose was 1800 psig (12.4 mPa), a practical operating pressure. The resulting PSA tape was found to have the following properties using the test procedures described above:
Fast Rate Peel Adhesion: 52–55 oz/inch (580–615 gm/cm);
Low Stress Peel Value: 5–7 minutes
Shear Value: 12–20 minutes The shear value of the PSA masking tape of this example is unacceptable for some applications, especially those where the tape is applied to a substrate, subjected to heating cycles and subsequently required to remove cleanly from the substrate.

COMPARATIVE EXAMPLE 2

PSA Tape Prepared With Crosslinking Promoter (No Non-thermosettable Phenolic Tackifying Resin)

A PSA tape was prepared using the same target formulation as in Comparative Example 1, except that 1 part crosslinking promoter was added.

The equipment and conditions employed in Example 1 were repeated, with the following exceptions. A crosslinking promoter or pro-rad, Vanax MBM (available from Vanderbilt Chemical Co.), was added to conveying zone C6 at a rate of 0.09 lbs/min (41 gm/min) using a small loss-in-weight feeder. As a result of the change, the pressure measured in the flexible hosing leading to the die jumped up to 3000 psig (20.7 mPa), an unworkably high viscosity given the pressure rating of the hose. In addition, the extrudate was difficult to coat smoothly and evenly at the target thickness of 1.65 mils (41 micrometers). The extrudate was coated onto. creped paper backing and cured by exposure to radiation. The resulting PSA masking tape was found to have the following properties using the test procedures described above:
Fast Rate Peel Adhesion: 40–42 oz/inch (450–470 gm/cm);
Low Stress Peel Value: 3 minutes
Shear Value: 150–250 minutes While the addition of the crosslinking promoter or pro-rad resulted in an improved shear value over Comparative Example 1, the low stress peel value of 3 minutes is unacceptable for most applications. In addition, the viscosity escalation makes this process impractical.

COMPARATIVE EXAMPLE 3

PSA Tape Prepared With Crosslinking Promoters and Additional Amounts of Hindered Phenol Antioxidant (Irganox™ 1010)

A PSA tape was prepared using the target formulation of Comparative Example 1 except that 1 part crosslinking promoter and 3 additional parts of antioxidant were used.

The equipment and conditions employed in Example 2 were repeated, with the following exceptions. Additional amounts of the Irganox™ 1010 antioxidant were added to conveying zone C6 along with the Vanax MBM at a rate of 0.27 lbs/min (120 gm/min) using the same loss-in-weight feeder used to deliver the Vanax MBM. The processing conditions downstream of conveying zone C6 did not change appreciably; however, the processing pressures in the reinforced hosing increased to 2600–2800 psig (17.9–19.3 mPa). Routine variability in the hose pressure was high enough to trigger emergency stops designed to protect the hosing. The coating was uneven and rough. The cured coating was found to have the following properties:

Fast Rate Peel Adhesion: 40–43 oz/inch (450–480 gm/cm)

Low Stress Peel Value: 4 minutes

Shear Value: 35–48 minutes

The low stress peel value is unacceptable for most applications. The viscosity is also impractical.

COMPARATIVE EXAMPLE 4

PSA Tape Prepared With Crosslinking Promoters and Additional Amounts of Tackifying Resin (Piccotac™ B Resin)

A PSA tape was prepared using the same target formulation as Comparative Example 2 except that a total of 90 parts of a non-phenolic tackifying resin was used.

The equipment and conditions employed in Example 2 were repeated, with the following exceptions. The flow rates of the Piccotac™ B resin additions in conveying zones C5 and C6 were increased to 2.03 lbs/min (1 kg/min) and 6.08 lbs/min (3 kg/min), respectively, to try to reduce the processing viscosity caused by the Vanax MBM addition. The processing viscosities were largely unchanged from those seen in Example 2, and the processing pressures were impractical. No tape was successfully made, and therefore, no adhesive properties were reported.

EXAMPLE 1

PSA Tape Prepared With Crosslinking Promoters and Non-thermosettable Phenolic Tackifying Resin A PSA tape was prepared using the same target formulation of Comparative Example 1 with the addition of 1 part non-thermosettable phenolic tackifying resin and 1 part crosslinking promoter.

The equipment and conditions employed in Example 2 were repeated, with the following exceptions. A non-thermosettable phenolic tackifying resin, SP-1068 (available from Schenectady Chemical Co.), was added to conveying zone C6 along with the Vanax MBM at a rate of 0.09 lbs/min (41 gm/min) using the same loss-in-weight feeder used to deliver the Vanax MBM. An additional 0.27 lbs/min (120 gm/min) of Piccotac™ B was also added with this same loss-in-weight feeder to prevent "bridging", or "cavitation", in the hopper above the feeder. The pressures measured in the flexible hose leading to the die measured 2000 psig (13.8 mPa), an acceptable level given the pressure rating of the hose. The extrudate was now easy to coat evenly and smoothly onto a creped paper backing. The cured coating was found to have the following properties:

Fast Rate Peel Adhesion: 55–57 oz/inch (615–640 gm/cm);

Low Stress Peel Value: 7–10 minutes

Shear Value: 50–250 minutes

This example demonstrates that the addition of non-thermosettable phenolic tackifying resin to solvent free hot melt processing eliminates the viscosity escalation problem associated with the use of crosslinking promoters (demonstrated in Comparative Example 2) while at the same time providing a PSA tape having good adhesive properties, especially a good balance between the resistance to low stress peel and fast rate peel adhesion. It is noted that the use of additional amounts of antioxidant or tackifying agent (demonstrated in Comparative Examples 3 and 4) failed to produce these results.

EXAMPLE 2

Preparation of a PSA Tape Using Solvent Techniques

PSA taps were prepared from solvent and tested for resistance to slow rate peel and fast peel adhesion according to the test procedures given above. In all cases, the PSA formulation comprised the following ingredients:

100 parts by weight natural rubber (CV-60)

90 parts by weight total tackifying resin (this includes the phenolic in each instance) and 1 part by weight Irganox 1010.

The tackifying resins used in each PSA tape were varied to show the effect of adding a non-thermosettable phenolic tackifying resin to the adhesive formulation. The tackifying resins used in the formulations were as follows:

SP-1068—a pure phenolic, non-thermosettable tackifying resin from Schenectady Chemicals, Inc.

SP-1077—an alkylphenolic, non-thermosettable tackifying resin from Schenectady Chemicals, Inc.

CRJ-418—an alkylphenolic, non-thermosettable tackifying resin from Schenectady Chemicals, Inc.

Escorez 1304—a C5 non-phenolic tackifying resin from Exxon

The tackifying resins and amounts (in parts by weight) used in each PSA formulation are given in Table 1.

Adhesives were prepared at 20% solids in heptane, coated at 10 grains per 24 $in^2$ (42 $g/m^2$) on creped masking tape backing, and electron beam cured at 4 MRad. Samples were not heat aged. The tapes were tested according to the procedures given above with results provided below in Table I.

TABLE I

| Sample | Escorez 1304 | CRJ-418 | SP-1068 | SP-1077 | Low Stress Peel (min) | Fast Rate Peel Adhesion oz/inch (gm/cm) |
|---|---|---|---|---|---|---|
| C1 | 90 | 0 | 0 | 0 | 15 | 56 (630) |
| 2 | 87.5 | 2.5 | 0 | 0 | 32 | 54 (600) |
| 3 | 87.5 | 0 | 2.5 | 0 | 95 | 53 (590) |
| 4 | 87.5 | 0 | 0 | 2.5 | 84 | 57 (640) |
| 5 | 85 | 5 | 0 | 0 | 30 | 56 (630) |
| 6 | 85 | 0 | 5 | 0 | 102 | 56 (630) |
| 7 | 85 | 0 | 0 | 5 | 82 | 56 (630) |

These data show that PSA tapes of the invention provide a good balance of the properties of resistance to low stress peel and fast rate peel adhesion. More specifically, Sample C1 (which comprised no phenolic resin) provided a low stress peel value of 15 minutes and a fast rate peel adhesion value of 56 oz/inch (630 gm/cm), whereas Samples 2–7 (which comprised phenolic resin) provided low stress peel values of at least 30 minutes while maintaining moderate fast rate peel adhesions in the range of 53 to 57 oz/inch (590 to 640 gm/cm).

We claim:

1. A solventless hot melt process for preparing a pressure sensitive adhesive from a tackified hydrocarbon elastomer, said process occurring in a continuous compounding device which has a sequence of alternating conveying and processing zones, said processing zones being capable of masticating and mixing, said process comprising the steps of:

(a) feeding a hydrocarbon elastomer to a first conveying zone to transport said elastomer to a first processing zone;

(b) masticating said elastomer in the first processing zone for a time sufficient to render it capable of (i) receiving adjuvants, and (ii) being extruded as a solventless hot melt pressure sensitive adhesive;

(c) transporting said masticated elastomer from the first processing zone to subsequent processing and conveying zones wherein a crosslinking promoter and a non-thermosettable phenolic tackifying resin are added and mixed therewith to form a blend said crosslinking promoter reacts with radicals to produce crosslinks; and (d) discharging said blend from said continuous compounding device, wherein said blend comprises a solventless hot melt pressure sensitive adhesive.

2. A process according to claim 1 wherein step (c) comprises the step of adding said crosslinking promoter and said non-thermosettable phenolic tackifying resin together as a blend.

3. A process according to claim 1 wherein step (c) further comprises the step of adding a non-phenolic tackifying resin.

4. A process according to claim 3 wherein step (c) comprises the addition of a blend of crosslinking promoter and non-thermosettable phenolic tackifying resin after said non-phenolic tackifying resin is added and blended with said masticated elastomer.

5. A process according to claim 3 wherein said step (c) comprises the addition of said non-phenolic tackifying resin at a rate sufficient to provide 1 to 400 parts by weight non-phenolic tackifying resin per 100 parts by weight elastomer.

6. A process according to claim 1 wherein said blend is discharged from said continuous compounding device as a thin film onto a moving web and exposed to radiation.

7. A process according to claim 6 wherein said radiation is selected from the group consisting of electron beam radiation and ultraviolet light.

8. A process according to claim 1 comprising the further step of adding adjuvants to said elastomer.

9. A process according to claim 1 wherein said elastomer comprises at least 50 percent by weight natural rubber.

10. A process according to claim 1 wherein said non-thermosettable phenolic tackifying resin is selected from the group consisting of phenol-aldehyde condensates, terpene-phenol reaction products, and phenolic reaction products.

11. A process according to claim 1 wherein said crosslinking promoter is selected from the group consisting of aromatic, aliphatic and heteroatomic monomers and oligomers containing at least two carbon—carbon double bonds.

12. A process according to claim 1 wherein said crosslinking promoter comprises moieties selected fro the group consisting acrylate, allylic and maleimide moieties.

13. A process according to claim 1 wherein said step (c) comprises the addition of said crosslinking promoter at a rate sufficient to provide 0.10 to 10 parts by weight crosslinking promoter per 100 parts by weight elastomer.

14. A process according to claim 1 wherein said step (c) comprises the addition of said non-thermosettable phenolic tackifying resin at a rate sufficient to provide 0.10 to 15 parts by weight non-thermosettable phenolic tackifying resin per 100 parts by weight elastomer.

15. A process according to claim 1 wherein said blend is discharged onto a moving web to form a thin film thereon.

* * * * *

UNITED STATES PATENT AND TRADEMARK OFFICE
CERTIFICATE OF CORRECTION

PATENT NO. : 5,914,157
DATED : June 22, 1999
INVENTOR(S) : Daniel C. Munson, Andrew C. Lottes, Angelo Psellas, and Denis A. Brisson It is certified that error appears in the above-identified patent and that said Letters Patent is hereby corrected as shown below:

Title page,
Section [54], insert "A" before -- SOLVENTLESS --;

Column 3,
Line 52, "ultra-violet" should read -- ultraviolet --;

Column 9,
Line 38, "TO: should read -- OT --;

Column 11,
Line 51, "wit" should read -- with --;

Column 12,
Line 48, "onto" should read -- onto --;

Column 14,
Line 18, "taps" should read -- tapes --;

Column 16,
Line 25, "fro" should read -- from --;
Line 26, "consisting acrylate" should read -- consisting of acrylate --.

Signed and Sealed this

Sixteenth Day of October, 2001

Attest:

NICHOLAS P. GODICI
Attesting Officer    Acting Director of the United States Patent and Trademark Office